US012079702B2

(12) United States Patent
Domeyer et al.

(10) Patent No.: US 12,079,702 B2
(45) Date of Patent: Sep. 3, 2024

(54) DRIVING AUTOMATION DEVICE TO MITIGATE THE RISK OF OTHER ROAD USERS

(71) Applicant: TOYOTA MOTOR ENGINEERING & MANUFACTURING NORTH AMERICA, INC., Plano, TX (US)

(72) Inventors: Joshua E. Domeyer, Madison, WI (US); Benjamin P. Austin, Saline, MI (US); John K. Lenneman, Okemos, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 231 days.

(21) Appl. No.: 17/103,096

(22) Filed: Nov. 24, 2020

(65) Prior Publication Data

US 2022/0161823 A1    May 26, 2022

(51) Int. Cl.
| | |
|---|---|
| *B60W 30/095* | (2012.01) |
| *G06N 3/04* | (2023.01) |
| *G08G 1/01* | (2006.01) |
| *G08G 1/16* | (2006.01) |

(52) U.S. Cl.
CPC ............ *G06N 3/04* (2013.01); *G08G 1/0112* (2013.01); *G08G 1/161* (2013.01); *G08G 1/166* (2013.01); *B60W 30/095* (2013.01); *B60W 2554/404* (2020.02); *B60W 2756/10* (2020.02)

(58) Field of Classification Search
CPC ....... B60W 30/0956; B60W 2554/404; B60W 2756/10; G06N 3/04
See application file for complete search history.

(56) References Cited

U.S. PATENT DOCUMENTS

| | | | |
|---|---|---|---|
| 9,361,409 B2 | 6/2016 | Kozloski et al. | |
| 10,019,902 B2 | 7/2018 | Gee et al. | |
| 10,149,132 B2 | 12/2018 | Kim et al. | |
| 10,490,078 B1 | 11/2019 | Fields et al. | |
| 10,733,893 B1* | 8/2020 | Swan | G08G 1/166 |
| 2013/0024073 A1* | 1/2013 | Son | B60W 30/0953 |
| | | | 701/45 |
| 2016/0355179 A1* | 12/2016 | Cannella | B60T 7/22 |
| 2017/0345292 A1 | 11/2017 | Haran | |
| 2018/0151077 A1* | 5/2018 | Lee | B60Q 9/008 |
| 2018/0365533 A1* | 12/2018 | Sathyanarayana | B60W 40/08 |
| 2019/0164422 A1 | 5/2019 | Bai et al. | |
| 2020/0074862 A1* | 3/2020 | Johnston | G08G 1/04 |
| 2021/0387573 A1* | 12/2021 | Hinson | G06T 7/70 |

FOREIGN PATENT DOCUMENTS

| | | |
|---|---|---|
| CN | 108961313 A1 | 12/2018 |
| GB | 2562049 A | 11/2018 |

* cited by examiner

*Primary Examiner* — Marc Burgess
*Assistant Examiner* — Karen Lynelle Furgason
(74) *Attorney, Agent, or Firm* — Oblon, McClelland, Maier & Neustadt, L.L.P.

(57) ABSTRACT

A system and method for a host vehicle to assess risk for road users is disclosed. The host vehicle monitors its surrounding driving environment and sends alerts to road users if a threat is detected. The host vehicle can determine the best course of action to mitigate a threat, and coordinate such action. The host vehicle comprises processing circuitry configured to perform the foregoing tasks. Further, the host vehicle may use a machine learning-based system comprising a trained neural network.

20 Claims, 5 Drawing Sheets

DRIVING AUTOMATION DEVICE TO MITIGATE THE RISK OF OTHER ROAD USERS

FIELD OF THE DISCLOSURE

The present disclosure is directed toward a system and method for an autonomous host vehicle to mitigate risk to one or more road users.

BACKGROUND

Roadway-related accidents occur every day, thus it is necessary to create safer roadways and mitigate danger to vulnerable road users. Road users can be any user on or nearby a road; examples of road users may be cyclists, pedestrians, motorists, and drivers of vehicles. In light of such problems, there exists a need to create safer roadways for road users.

SUMMARY

In an exemplary aspect, a method for broadcasting safety related information from a host vehicle traveling on a road includes monitoring, from the host vehicle, behavior of a first road user and a second road user. The method also includes determining, by the host vehicle and from the monitored behavior of the first road user and the second road user, whether a threat to the first road user or the second road user is present. The threat is determined based on movement of the first road user or the second road user relative to other objects disposed about the road. The method further includes signaling from the host vehicle to at least one of the first road user or the second road user of the threat in a case that the threat is determined to be present.

In an exemplary aspect, a system for broadcasting safety related information from a host vehicle traveling on a road includes processing circuitry configured to monitor, from the host vehicle, behavior of a first road user and a second road user. The processing circuitry is also configured to determine, by the host vehicle and from the monitored behavior of the first road user and the second road user, whether a threat to the first road user or the second road user is present. The threat is determined based on movement of the first road user or the second road user relative to other objects disposed about the road. The processing circuitry is further configured to signal from the host vehicle to at least one of the first road user or the second road user of the threat in a case that the threat is determined to be present.

In an exemplary aspect, the host vehicle includes a machine learning-based system to determine whether the threat is present, the machine learning-based system comprising a trained neural network. They hose vehicle may also be an autonomous or semi-autonomous vehicle.

In an exemplary aspect, the signaling is transmitted auditorily, visually, using wireless communication, or via a combination thereof. In another exemplary aspect, the signaling includes intervention by the host vehicle, the intervention being a change in position, speed, or a combination thereof by the host vehicle.

In an exemplary aspect, a magnitude of the threat is obtained from collected sensor data by the host vehicle in the case that the threat is determined to be present. The magnitude of the threat depends on speed of the first road user or the second road user relative to other objects disposed about the road, size of the first road user or second road user relative to other objects disposed about the road, or a combination thereof.

In an exemplary aspect, the signaling executes a course of action that mitigates the magnitude of the threat. In another exemplary aspect, the degree of the signaling increases as the magnitude of the threat increases.

In an exemplary aspect, the behavior of the first road user and the second road user is monitored for a distraction level by the host vehicle. The distraction level is determined by at least one of the first road user's head orientation and the second road user's head orientation.

In another exemplary aspect, a non-transitory computer-readable medium including computer-readable instructions that, when executed by a computing system, cause a computing system to sort data by monitoring, from the host vehicle, behavior of a first road user and a second road user, and determining, by the host vehicle and from the monitored behavior of the first road user and the second road user, whether a threat to the first road user or the second road user is present. The threat being is based on movement of the first road user or the second road user relative to other objects disposed about the road. The method also includes signaling from the host vehicle to at least one of the first road user or the second road user of the threat in a case that the threat is determined to be present.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

DETAILED DESCRIPTION

Figure 1:
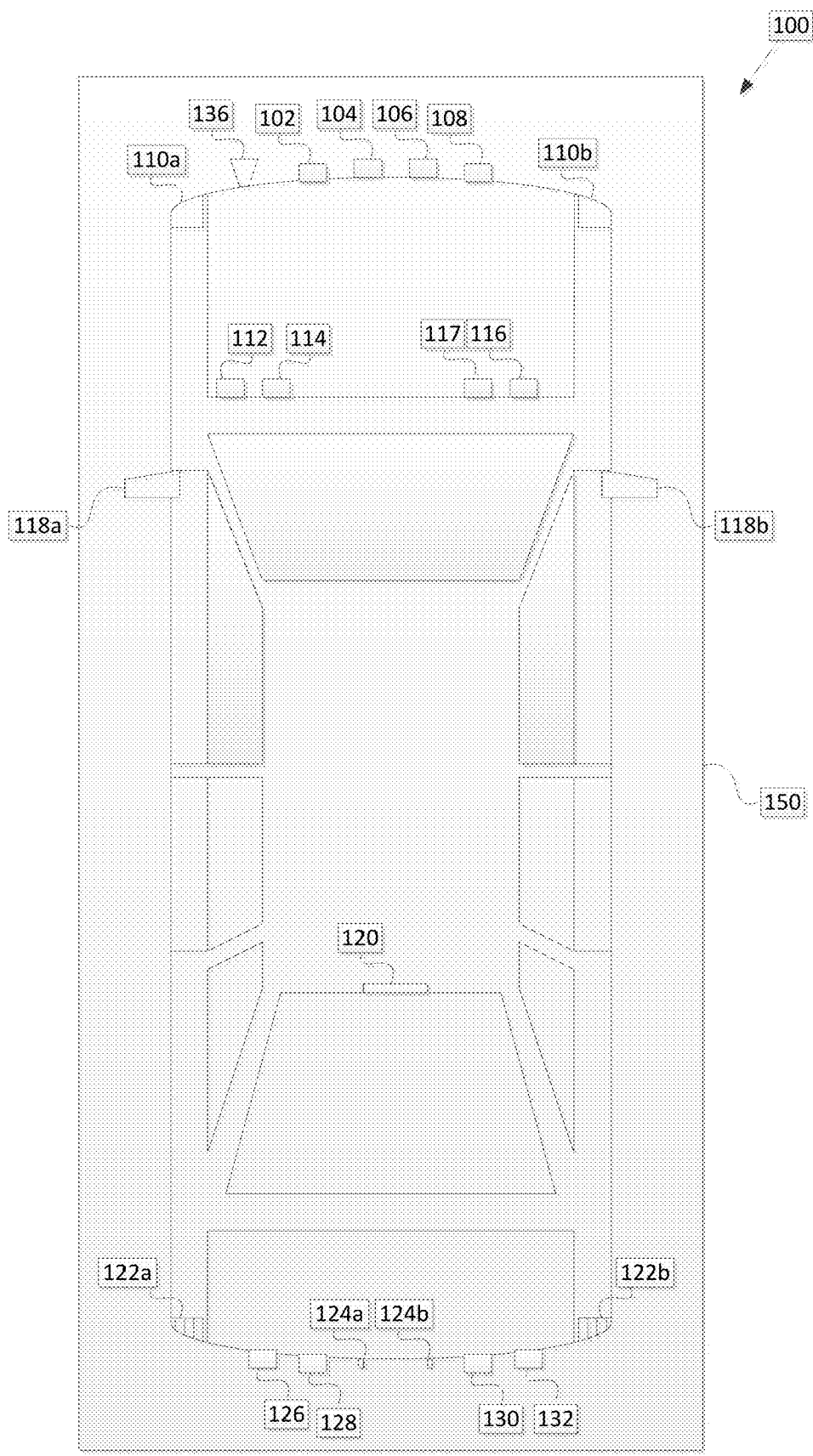
FIG. 1 shows a host vehicle equipped to monitor a driving environment, according to one example.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The order of discussion of the different steps as described herein has been presented for the sake of clarity. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways. This disclosure describes an autonomous/semi-autonomous vehicle to illustrate the various embodiments, but these concepts can be applied to similar systems. Further, as used herein, the words "a", "an" and the like generally carry a meaning of "one or more", unless stated otherwise.

It can be appreciated that the methods of the present disclosure may be implemented within an automated (autonomous or semi-autonomous) vehicle, as shown in FIG. 1, for example. FIG. 1 is a view of a vehicle system for assessing risk to one or more road users, and will be referred to as the host vehicle 100 herein. Road users can be any user on or nearby a road. The host vehicle 100 is equipped with one or more sensors for monitoring a driving environment. The host vehicle 100 includes processing circuitry 150, a head lamp unit 110a, a head lamp unit 110b, a Center High Mounted Stop Lamp (CHMSL) 120, a tail lamp unit 122a, a tail lamp unit 122b, a license plate lamp 124a, a license plate lamp 124b, a communication unit 116, a location unit 117, at least one of a radar unit 102, an infrared unit 104, a camera unit 106, a lidar unit 108 for monitoring a first end (front) of the host vehicle 100, a blindspot monitor 118a and a blindspot monitor 118b for monitoring sides of the host vehicle 100, and an audio unit 136. The host vehicle 100 may further include one or more vehicle system controllers for controlling vehicle dynamic behavior. Examples include a brake controller 112 and a steering controller 114. The CHMSL 120 may comprise multiple, independently controlled lighting elements. These various components making up the host vehicle 100 can be implemented by circuitry.

The host vehicle 100 may further include one or more of a radar unit 126, an infrared unit 128, a camera unit 130, and a lidar unit 132 for monitoring at a second end (rear) of the host vehicle 100. The host vehicle 100 is so equipped for the purpose of monitoring the driving environment and responding to hazardous or potentially hazardous situations to enhance safety for occupants and others within close proximity of the host vehicle 100. Thus, in another embodiment, additional sensors may be added to the host vehicle 100, such as a set of sensors (e.g. radar unit, infrared unit, camera unit, and lidar unit) on the left side of the host vehicle 100, and/or a set of sensors on the right side of the host vehicle 100.

In one embodiment, the processing circuitry 150 is implemented as one of or as a combination of: an application specific integrated circuit (ASIC), a field programmable gate array (FPGA), a generic array of logic (GAL), a programmable array of logic (PAL), circuitry for allowing one-time programmability of logic gates (e.g., using fuses) or reprogrammable logic gates. Furthermore, the processing circuitry 150 can include a computer processor and having embedded and/or external non-volatile computer readable memory (e.g., RAM, SRAM, FRAM, PROM, EPROM, and/or EEPROM) that stores computer instructions (binary executable instructions and/or interpreted computer instructions) for controlling the computer processor to perform the processes described herein. The computer processor circuitry may implement a single processor or multiprocessors, each supporting a single thread or multiple threads and each having a single core or multiple cores. In an embodiment in which neural networks are used, the processing circuitry used to train the artificial neural network need not be the same as the processing circuitry used to implement the trained artificial neural network that performs the techniques described herein. For example, processor circuitry and memory may be used to produce a trained artificial neural network (e.g., as defined by its interconnections and weights), and an FPGA may be used to implement the trained artificial neural network. Moreover, the training and use of a trained artificial neural network may use a serial implementation or a parallel implementation for increased performance (e.g., by implementing the trained neural network on a parallel processor architecture such as a graphics processor architecture).

The processing circuitry 150 may comprise a data bus such as a control area network (CAN) and one or more electronic modules distributed about the host vehicle 100, for example an engine control unit (ECU), transmission control unit (TCU), anti-lock brake system (ABS), body control modules (BCM), and various sensors, as well as related software for sensing, detecting, and controlling certain vehicle operations. Further, the processing circuitry 150 may be connected to additional communication systems or configured to communicate with other devices or networks that may be internal to or external of the host vehicle 100, and to send and/or receive data pertaining to the host vehicle 100 or an operating environment.

Using available sensors, the processing circuitry 150 may monitor and actively control certain driving functions during vehicle operation in an automated mode, partially automated mode, or through intervention while the host vehicle 100 is operated in a driving mode involving some control by a human operator, as the host vehicle 100 detects potentially hazardous scenarios based on analysis of data collected.

In one embodiment, each radar unit 102 and radar unit 126 monitors activity near or facing the first and the second end of the host vehicle 100, respectively, using radar technology to detect the driving environment, for example by using radio waves to detect other vehicles and objects in the vicinity of the host vehicle 100.

In one embodiment, each infrared unit 104 and infrared unit 128 monitors activity near or facing the first and the second end of the host vehicle 100, respectively, using infrared technology to detect the driving environment, for example by creating an image of surrounding terrain based on heat signatures of surrounding objects detected.

In one embodiment, each camera unit 106 and camera unit 130 monitors activity near or facing the first and the second end of the host vehicle 100, respectively, using camera and visual technology to detect the driving environment, for example by using digital cameras and computer vision software to recognize obstacles in the road.

In one embodiment, each lidar unit 108 and lidar unit 132 monitors activity near or facing the first and the second end of the host vehicle 100, respectively, using LIDAR technology to detect the driving environment, for example by creating a 3D map from the reflected light signals received as a result of emitting light.

In one embodiment, each blindspot monitor 118a and blindspot monitor 118b monitors for obstacles and objects directly to a left and right side of a host vehicle 100, respectively, generally using radar, ultrasound, or camera-based technology to detect the driving environment by monitoring for objects, other vehicles, etc. adjacent to a side of the host vehicle 100.

The location unit 117 may comprise at least one of a number of elements, such as GPS and cellular signal triangulation, allowing the processing circuitry 150 to determine the location of the host vehicle 100.

The communication unit 116 may comprise at least one of a number of elements that are individually controlled allowing for receiving and broadcasting signals related to driving conditions, for example via Dedicated Short Range Communications (DSRC), Wi-Fi, cellular networks, and radio. Further, the communication unit 116 could work with the processing circuitry 150 to send and receive vehicle-to-everything data (V2X).

Availability of additional driving environment data may aid the processing circuitry 150 in determining potential hazards and threats, and improve the ability of the processing circuitry 150 to mitigate risk. As an example, the location unit 117 could gather the GPS coordinates of the host vehicle 100, and use the communication unit 116 to gather traffic, roadwork, and weather data at that location.

The brake controller 112 may be configured to allow the processing circuitry 150 to control the magnitude and timing of use of a vehicle brake disposed at each wheel. The steering controller 114 may be configured to allow for the processing circuitry 150 to control the magnitude and timing of the vehicle steering to swerve the host vehicle 100 as needed and deemed appropriate by the processing circuitry 150. For example, if a signal involves intervention by the host vehicle 100, the processing circuitry 150 may control the brake controller 112 and/or steering controller 114. In another embodiment, the host vehicle 100 may have other controllers that can control the host vehicle 100 for intervening.

Each of the head lamp unit 110a, the head lamp unit 110b, the CHMSL 120, the tail lamp unit 122a, the tail lamp unit 122b, the license plate lamp 124a, and the license plate lamp 124b, may be connected to the processing circuitry 150, and may comprise one or more lighting elements that are individually controlled allowing for a variety of signaling modes that may involve emitting at least one of varying levels of intensity (e.g., brightness), color, time duration, and other effects such as rapid flashing, strobing, or other illumination sequences or patterns to visually signal a hazardous situation or emergency vehicle maneuver. In one example, only the tail lamp unit 122a or only the tail lamp unit 122b may flash repeatedly. In another example, both the tail lamp unit 122a and the tail lamp unit 122b flash repeatedly simultaneously. In another example, the tail lamp unit 122a and the tail lamp unit 122b alternate flashing repeatedly such that when the tail lamp unit 122a is illuminated the tail lamp unit 122b is not illuminated, and vice versa. In another example, the tail lamp unit 122a may flash repeatedly while the tail lamp unit 122b remains illuminated, or vice versa. The examples provided in this paragraph may also be applicable to any combination of the head lamp unit 110a, the head lamp unit 110b, the license plate lamp 124a, and the license plate lamp 124b.

The audio unit 136 serves to receive and/or transmit sound, and may comprise components such as a horn, speaker, and microphone. The audio unit 136 may be connected to and operated by the processing circuitry 150 to, for example, audibly signal a hazardous or emergency situation. The signal may comprise a pattern or sequence of sounds. For example, after the processing circuitry 150 has determined the best course(s) of action to mitigate the hazardous or emergency situation, the speakers may audibly relay the danger/message, for instance, through a voice message telling a pedestrian to stop or for a nearby vehicle to slow down. Additionally, a microphone could be used to gather sound data (e.g. tires screeching, train horn, group of people talking, etc.), which could be sent to the processing circuitry 150 for further analysis of a given scenario.

This disclosure is directed toward an autonomous or semi-autonomous host vehicle 100 monitoring its surrounding (e.g. road user dynamics, road user predicted intent, driver attentiveness/distraction-level, salient road structures, etc.) and broadcasting information to one or more road users that their own safety or the safety of another road user is threatened; such broadcasted information could be delivered, for example, audibly, visually, wirelessly, etc. Road users can be any user on or nearby a road; examples of road users may be cyclists, pedestrians, motorists, drivers of vehicles, passengers of vehicles, and skaters. It should be noted that different road users can have different levels of vulnerability. For example, a pedestrian or cyclist can be a more vulnerable road user compared to a vehicle. Some factors for determining a level of vulnerability can include a road user's speed, size, and weight.

In one embodiment, the disclosed system and method are directed to an automated vehicle (i.e., host vehicle 100) monitoring it's surrounding, and broadcasting information to a first road user that their safety is threatened. This threat can come from a second road user, or any other object, such as an animal, pothole, etc. For example, the road user may be a pedestrian at risk of colliding with a car. As another example, the road user may be a driver of a vehicle at risk of colliding with a deer crossing the road. As another example, the road user may be a manually driven vehicle at risk of colliding with an autonomous vehicle. As another example, the road user may be a cyclist at risk of riding over a large pothole. As another example, the road user may be a vehicle backing out of a parking spot at risk of bumping into a curb or signpost. The host vehicle 100 may monitor adjacent road users' behavior to predict intent/determine if they acknowledge the presence of other road users or objects such that dangerous situations can be avoid/mitigated (e.g. an adjacent vehicle can yield, stop, and/or safely avoid a vulnerable pedestrian). In one embodiment, the automated host vehicle 100 can monitor road user dynamics such as trajectories, speeds, accelerations, location, directional changes, brake frequency, variations in speed over time, etc. to aid in making the determination. Other factors, such as road user identity or physical size can also be considered.

In another embodiment, the host vehicle 100 can measure attentiveness/distraction level of a road user to determine threat. Factors such as what direction a driver is facing (i.e. head orientation), whether their hands are on the wheel, if the road user is listening to music, etc. can be considered when determining a level of distraction. For example, if a driver of an adjacent vehicle is looking downwards or on their cellphone, they may be considered more dangerous than a driver who is not looking downwards or on their cellphone. In one embodiment, computer vision can be used to capture/measure attentiveness/distraction level. For example, the host vehicle 100 can use camera unit 106 and camera unit 130 to capture video of an adjacent driver, and send the video to the processing circuitry 150 for processing the distraction level of a driver. Further, the host vehicle 100 can monitor if an adjacent vehicle is driving sporadically, performing unnatural maneuvers, driving above/below the speed limit, etc. to estimate distraction level.

A road user that is a vehicle can be manually driven, semi-autonomous, or fully autonomous. When the host vehicle 100 detects a road user and subsequently predicts that the safety of the road user is in jeopardy (e.g. from an adjacent vehicle's dynamics, an adjacent driver's distraction level, identity/type of a road user, etc.), the host vehicle 100 can signal the road user so that they can be made aware of the presence of danger, where the danger is coming from, the magnitude of the danger, how to avoid the danger, etc. For example, the host vehicle 100 may flash headlights, sound a horn, produce a voice command, make an intervention such as merging or crowding a lane, etc., to alert a vulnerable first road user that an adjacent, second road user may not be able to safely stop/avoid the first road user.

In one embodiment, to signal a road user, the host vehicle 100 can make an intervention. The host vehicle 100 can make an intervention that makes itself more visible to the road user, such as the host vehicle 100 changing its position and/or speed. For example, if the host vehicle 100 detects that a vehicle behind it in an adjacent lane does not detect a pedestrian, the host vehicle 100 can merge or crowd the lane of the vehicle (e.g., using steering controller 114) to warn the vehicle and/or vehicle's driver. Other examples of interventions that the host vehicle 100 could make include abrupt braking, swerving, etc.

In one embodiment, the host vehicle 100 may signal to a road user that it is in danger from other objects, such as a fallen mattress, pothole, ice patch, etc.

The signal to alert of a threat could be delivered using one or a combination of different methods, including but not limited to: audibly (e.g. via honking a horn or speakers transmitting an audio signal, screeching tires, etc.), visually (e.g. via headlights, lane crowding, merging lanes, abrupt braking, swerving, etc.), and using wireless communication (e.g. via vehicle-to-everything (V2X) communication). V2X communication can include vehicle-to-vehicle (V2V), vehicle-to-pedestrian (V2P), vehicle-to-network (V2N), vehicle-to-infrastructure (V2I), etc.

The signal to alert can vary in effect and/or type depending on the magnitude of the threat, the response of a road user to an initial signal, best course of action to mitigate a given threat, etc. For example, as the magnitude of a threat increases, the effect of the signal can also increase accordingly.

Figure 2:
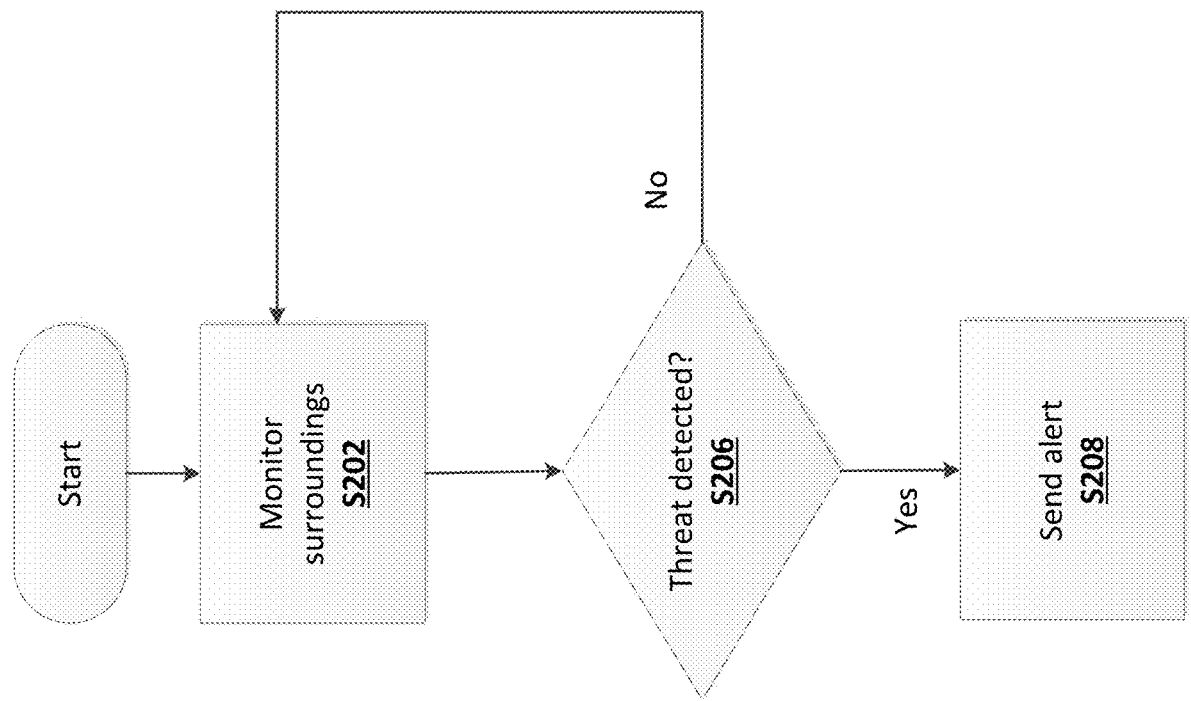
FIG. 2 is an operating flowchart performed by the processing circuitry of the host vehicle, according to one example.

FIG. 2 is an algorithmic flowchart walking through the steps that the processing circuitry 150 of a host vehicle 100 may be programmed to run, according to one example. In S202, the processing circuitry 150 of the host vehicle 100 monitors its surrounding environment by analyzing data sent to it from various components of the host vehicle 100. For example, the processing circuitry 150 in the host vehicle 100 could analyze any one or combination of data gathered by the radar unit 102, radar unit 126, infrared unit 104, infrared unit 128, camera unit 106, camera unit 130, lidar unit 108, lidar unit 132, blindspot monitor 118*a*, and blindspot monitor 118*b*, as well as the communication unit 116, location unit 117, and audio unit 136. Example of data gathered could include the presence of road users, identity of the road user (e.g., whether it is a pedestrian, vehicle, etc.), presence and/or identity of other objects, road signs, traffic lights, wirelessly received data, and driver distraction level. If the road user is a vehicle, information gathered could include its trajectory, speed, acceleration, location, directional change, brake frequency, variation in speed over time, etc. Wirelessly received data could include any data received by the communication unit 116 or location unit 117, such as V2X communications, GPS coordinates, weather data, traffic data, road conditions, roadwork warnings, etc., and the audio unit 136, such as the sound of tires screeching, sirens blaring, a train whistling, a honking horn, etc.

In S206, the processing circuitry 150 determines whether a threat is detected using the data gathered from S202. The threat can be that the safety of a road user is at risk. In one embodiment, a trained neural network can be implemented into the processing circuitry 150 of the host vehicle 100 to detect the presence of a threat. If a threat is not detected, S202 is performed.

In another embodiment, the magnitude of a threat can also be calculated in S206. If the threat is small in physical dimension, such as a small pothole or dead squirrel, the magnitude of the threat can be smaller than if the threat is large in physical dimension, such as an accelerating vehicle heading directly towards a pedestrian. Further, the magnitude of a threat can be determined using a machine learning based system implemented into the host vehicle 100 that has been trained to output a threat level for a given scenario/surrounding. If the magnitude of a threat reaches a minimum threshold value, a threat could be considered detected in S206; if the magnitude of a threat is below a threshold value, a threat could be considered undetected, and perform S202.

If a threat is detected, an alert is sent in S208 to warn the road user(s); the alert could serve as a warning signal and/or advise on the best course of action to mitigate the threat. The alert may be visual (e.g. the host vehicle 100 flashing one or more of its various headlights, making an intervention, etc.), auditory (e.g. the audio unit 136 producing a sound using its horn(s) and/or speaker(s)), or transmitted via wireless communication (e.g. V2V communication telling a vehicle to stop, V2P communication notifying a pedestrian to look up from their phone, etc.). To flash headlights, any one or combination of the head lamp unit 110*a*, head lamp unit 110*b*, center high mounted stop lamp 120, tail lamp unit 112*a*, tail lamp unit 112*b*, license plate lamp 124*a*, and/or license plate lamp 124*b* could be used. Further, the headlights could be flashed in various patterns, colors, sequences, etc. to provide supplementary information, such as threat level (e.g. a brighter headlight could indicated a greater threat level), the location of the threat (e.g. only the headlights on the right side of the host vehicle 100 could be flashed if the threat is on the right side), etc. Alternatively or additionally, the alert could come from another road user, rather than the host vehicle 100 that first detected a threat. For instance, a first vehicle at risk of colliding with a cyclist may receive instruction from the host vehicle 100 (e.g. through V2V communication) commanding it to send an alert to the cyclist. Alternatively or additionally, an adjacent, second vehicle could be prompted by the host vehicle 100 to send an alert if it happens to be more visible (e.g. closer to the threat, in vulnerable road user's line-of-sight, etc.) for a threatened road user, or the first vehicle doesn't have the capability to receive/transmit such information.

To send a warning signal where the host vehicle 100 makes an intervention, a control algorithm could be implemented into the processing circuitry 150 to manipulate the host vehicle 100, such as controlling the steering controller 114 and/or brake controller 112. In one embodiment, the control algorithm can detect the presence of a threat, determine the safest course of action to mitigate the threat, and if the safest course of action involves an intervention by the host vehicle 100, determine the appropriate type of intervention (e.g. swerving, crowding a lane, etc.), and control the steering controller 114 and/or brake controller 112 to execute such intervention.

Additionally, the host vehicle 100 could be a machine learning-based system comprising a trained neural network which could be implemented into the processing circuitry 150. In one instance, the neural network could be trained using test and/or reference data. For example, the data used to train the neural network could comprise scenarios of legitimate threats and illegitimate threats to train for threat detection. Further, threats with different levels of magnitude/ danger can be used to train the neural network. In another example, the data used to train the neural network could comprise scenarios where another road user and/or object is or is not present, and further, it's identity if present. In addition, the neural network can be trained to more accurately monitor surroundings by training the network with data of known surroundings. Examples of such known surroundings that can be used for training the neural network can include salient road infrastructure (e.g. road signs, traffic lights, pedestrian lights, surrounding building details, etc.). In addition, adjacent road user trajectory information that indicates its intent can also be used for training data. Based on the initial perception of the appropriate response for a situation (e.g. stop), the host vehicle 100 can use training on the intent of the adjacent road user to determine whether it will stop. Alternatively, the host vehicle can choose not to signal or perform an action if that would lead to the correct behavior in the other road user.

For reinforcement training, the machine learning system observes to-what-extent the road user responds to a visual and/or auditory warning. If they do respond as expected, then the warning magnitude can be reinforced in the machine learning system. If they do not respond, the machine learning system can modify the magnitude of warning.

In one embodiment, the machine learning system can be trained to consider all possible courses of action for a given threat, and determine a course of action that mitigates the threat. After such course of action has been determined, the host vehicle 100 can execute/coordinate such course of action when signaling. Training can be accomplished using an initial scenario where a threat is present, and the machine learning system must identify the most appropriate course of action. The machine learning system can receive feedback on whether the most appropriate course of action was chosen. In another embodiment, the course of action to be carried out can be the one that has the greatest effect on minimizing the threat (i.e. biggest threat mitigation).

Figure 3A:
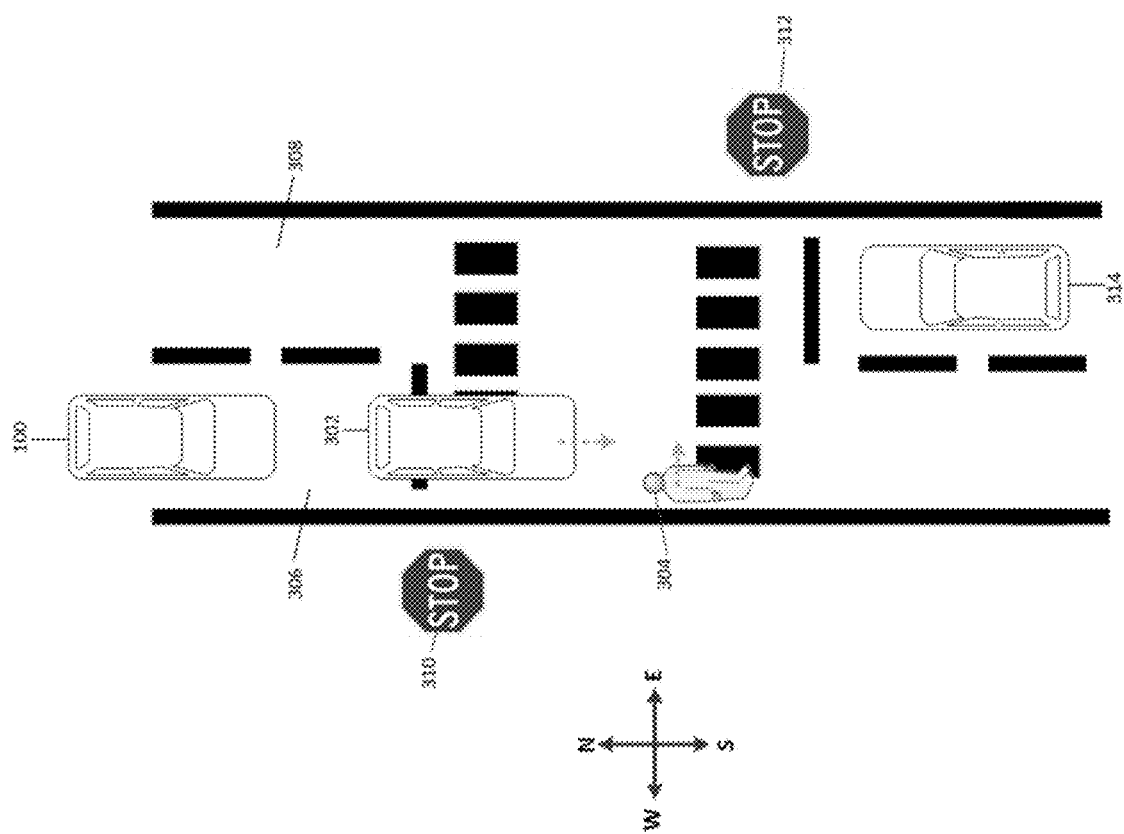
FIG. 3A is a first operating scenario, according to one example.

FIG. 3A presents an example scenario illustrating the above mentioned techniques. A stationary host vehicle 100 waits near a stop sign 310 in the left lane 306 behind a first road user 302, which is a vehicle also in the left lane 306, and moving south. At this time, a second road user 304 heads east to cross the street. A third road user 314 is a stationary vehicle in the right lane 308 and waits at stop sign 312. In this example, the third road user 314 is an autonomous vehicle with the same configuration as the host vehicle 100 (i.e. capable of V2X communication, has a horn, has headlights, has a steering controller, etc.). The second road user 304 expected the first road user 302 in the left lane 306 to stop (as directed by the stop sign 310), and did not realize that the first road user 302 had actually continued heading south in the direction of the second road user 304, ignoring the stop sign 310. All the while, the host vehicle 100 has been monitoring its surroundings (similar to S202 in FIG. 2). While monitoring its surroundings, the host vehicle 100 detects the first road user 302, the second road user 304, and third road user 314. Further, the host vehicle 100 can recognize stop sign 310 and stop sign 312. Based on the data gathered, the processing circuitry 150 of the host vehicle 100 determines that a large threat is present (similar to S206 in FIG. 2) because the safety of the second road user 304 is at risk. The host vehicle can recognize that the first road user 302 is not decelerating as expected, and further anticipate that the first road user 302 is showing no intention of stopping. Therefore, the host vehicle 100 can send out an alert to notify the second road user 304 and/or first road user 302 (similar to S208 in FIG. 2) to proceed with caution. As an example, the host vehicle 100 may send an alarm via a honk or flashing headlight. This can cause the second road user 304 to look in the direction of the host vehicle 100/alarm source (north) and notice the first road user 302 is driving south towards them.

Furthermore, prior to the host vehicle 100 sending an alarm, the host vehicle 100 could have considered sending a command to the third road user 314 to send an alert instead of the host vehicle 100. Though, in this scenario, if the third road user 314 had sent an alarm instead of the host vehicle 100, the second road user 304 may have looked in the direction of the third road user 314 (south), which is in the opposite direction of where the threat/first road user 302 is coming from. This could cause the second road user 304 to not notice the oncoming first road user 302, or realize too late. This is an example of the host vehicle 100 considering multiple courses of action, and executing the optimal course of action.

Figure 3B:
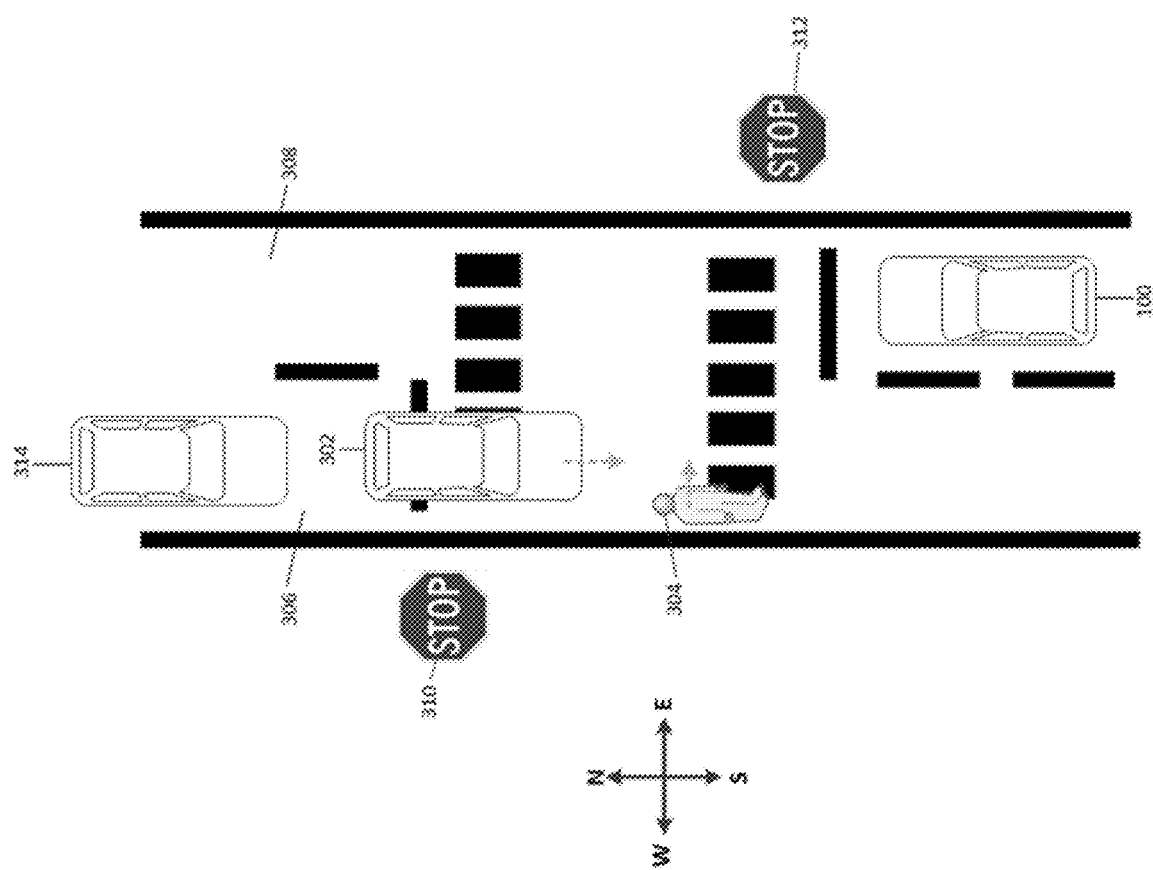
FIG. 3B is a second operating scenario, according to one example.

FIG. 3B illustrates another scenario. This scenario is very similar to that explained for FIG. 3A, except the host vehicle 100 is in the right lane 308 and the third road user 314 is in the left lane 306. For the scenario shown in FIG. 3B, if the host vehicle 100 is the source of the alarm, the second road user 304 may look towards the direction of the host vehicle (south) and notice the first road user 302 heading towards them too late. In such a scenario, as the host vehicle 100 monitors its surroundings, it can determine that the third road user 314 is in a better position to send an alarm. For example, the host vehicle 100 can send a V2V alert to the third road user 314, and command the third road user 314 to honk its horn. Furthermore, if the host vehicle 100 notices that the second road user 304 didn't react to the alarm from the third road user 314, or the first road user 302 shows no intention of stopping, the host vehicle 314 could command the third road user 314 to send out another alarm, this time of larger (i.e. more noticeable) degree (e.g. honk the horn louder, honk the horn in a different pattern, honk the horn and flash the headlights at the same time, etc.). In other words, the degree of the signaling can increase as the magnitude of the threat increases; this signaling can come from the host vehicle 100, or another road user that was commanded to signal from the host vehicle 100, as illustrated above.

Figure 4:
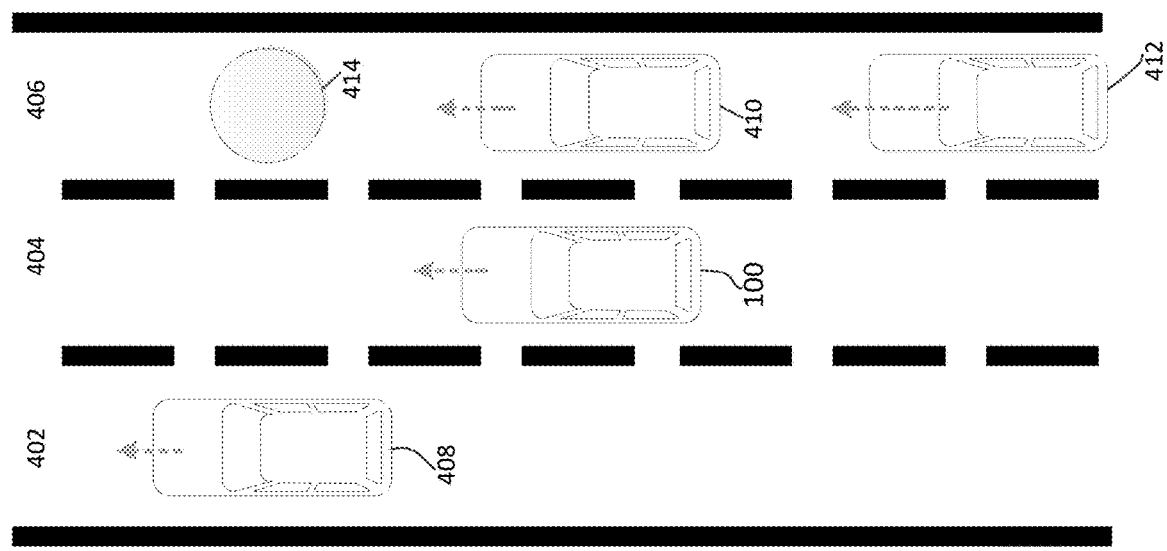
FIG. 4 is a third operating scenario, according to one example.
Figure 4:
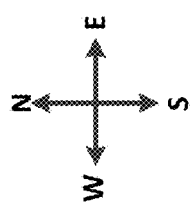

FIG. 4 presents another example scenario illustrating the above mentioned techniques. A host vehicle 100 is driving north in center lane 404, an adjacent second road user 408 is driving north in left lane 402, an adjacent third road user 412 is driving north in right lane 406, an adjacent fourth road user 410 is driving north in right lane 406, and an object 414 (e.g. roadkill, fallen mattress, etc.) is in right lane 406. All the road users are vehicles moving at approximately the same speed and showing no signs of decelerating.

In this example, as the host vehicle 100 is driving and monitoring its surrounding, it detects the object 414, the second road user 408, the third road user 412, and the fourth road user 410. From the monitoring, the host vehicle 100 determines that the fourth road user 410 is in danger and at risk of colliding with the object 414; this determination can be made on a variety of factors, such as the fourth road user 410 being distracted or not decelerating. The host vehicle 100 sends out an alert so that the fourth road user 410 can avoid a collision. If the host vehicle 100 notices that the fourth road user 410 doesn't start to decelerate even after the alert has been sent, the host vehicle 100 can send out the same alert again, the same alert at a more noticeable degree, and/or a different type of alert; again the degree of the signaling can increase as the magnitude of the threat increases.

Further, if the host vehicle 100 determines that the fourth road user 410 cannot avoid the object 414 by stopping, or that the abrupt stopping of the fourth road user 410 could cause the third road user 412 to collide into the fourth road user 410, the processing circuitry 150 could control the host vehicle 100 to, for example, switch into the left lane 402 (using the steering controller 114). This could create space for the fourth road user 410 and/or third road user 412 to move into the center lane 404 and avoid colliding with each other and/or the object 414. This maneuver can be done after determining that it is the safest course of action to mitigate the risk, or that is maneuver is safer for the host vehicle 100 and adjacent vehicles compared to running over/colliding with the object 414.

In another embodiment, the magnitude of the threat presented by the object 414 can be determined, and then used to adjust the type of intervention used. For example, some objects (e.g. small potholes, raccoons, etc.) can pose a smaller danger than others (e.g. deer, fallen mattress, etc.). The magnitude of threat can be considered when determining the safest course of action to mitigate a risk. As an example, for objects with a lower magnitude of threat, it may be safer to run over them rather than stop or swerve to avoid them. On the other hand, it may be safer to stop or swerve to avoid objects with a larger magnitude of threat. In other words, the magnitude of a threat can be considered when determining the safest (i.e. least dangerous) maneuver to mitigate a dangerous situation. In one embodiment, the magnitude of a threat can be based on the size of the object.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

Embodiments of the present disclosure may also be as set forth in the following parentheticals.

(1) A method for broadcasting safety related information from a host vehicle traveling on a road, the method comprising: monitoring, from the host vehicle, behavior of a first road user and a second road user; determining, by the host vehicle and from the monitored behavior of the first road user and the second road user, whether a threat to the first road user or the second road user is present, the threat being determined based on movement of the first road user or the second road user relative to other objects disposed about the road; and, signaling from the host vehicle to at least one of the first road user or the second road user of the threat in a case that the threat is determined to be present.

(2) The method of (1), wherein the host vehicle includes a machine learning-based system to determine whether the threat is present, the machine learning-based system comprising a trained neural network.

(3) The method of any (1) to (2), wherein the host vehicle is a semi-autonomous vehicle or an autonomous vehicle.

(4) The method of any (1) to (3), wherein the signaling is transmitted auditorily, visually, using wireless communication, or via a combination thereof.

(5) The method of any (1) to (4), wherein the signaling includes intervention by the host vehicle, the intervention being a change in position, speed, or a combination thereof by the host vehicle.

(6) The method of any (1) to (5), further comprising: obtaining, from collected sensor data by the host vehicle, a magnitude of the threat in the case that the threat is determined to be present, wherein the magnitude of the threat depends on speed of the first road user or the second road user relative to other objects disposed about the road, size of the first road user or second road user relative to other objects disposed about the road, or a combination thereof.

(7) The method of any (1) to (6), wherein the signaling executes a course of action that mitigates the magnitude of the threat.

(8) The method of any (1) to (7), wherein degree of the signaling increases as the magnitude of the threat increases.

(9) The method of any (1) to (8), wherein monitoring behavior of the first road user and the second road user includes monitoring for a distraction level by the host vehicle, the distraction level being determined by at least one of the first road user's head orientation and the second road user's head orientation.

(10) A system for broadcasting safety related information from a host vehicle traveling on a road, the system comprising: processing circuitry configured to: monitor, from the host vehicle, behavior of a first road user and a second road user; determine, by the host vehicle and from the monitored behavior of the first road user and the second road user, whether a threat to the first road user or the second road user is present, the threat being determined based on movement of the first road user or the second road user relative to other objects disposed about the road; and, signal from the host vehicle to at least one of the first road user or the second road user of the threat in a case that the threat is determined to be present.

(11) The system of (10), wherein the host vehicle includes a machine learning-based system to determine whether the threat is present, the machine learning-based system comprising a trained neural network.

(12) The system of any (10) to (11), wherein the host vehicle is a semi-autonomous vehicle or an autonomous vehicle.

(13) The system of any (10) to (12), wherein the signal is transmitted auditorily, visually, using wireless communication, or via a combination thereof.

(14) The system of any (10) to (13), wherein the signal includes intervention by the host vehicle, the intervention being a change in position, speed, or a combination thereof by the host vehicle.

(15) The system of any (10) to (14), wherein the processing circuitry is further configured to: obtain, from collected sensor data by the host vehicle, a magnitude of the threat in the case that the threat is determined to be present, wherein the magnitude of the threat depends on speed of the first road user or the second road user relative to other objects disposed about the road, size of the first road user or second road user relative to other objects disposed about the road, or a combination thereof.

(16) The system of any (10) to (15), wherein the signal executes a course of action that mitigates the magnitude of the threat.

(17) The system of any (10) to (16), wherein degree of the signal increases as the magnitude of the threat increases.

(18) The system of any (10) to (17), wherein monitored behavior of the first road user and the second road user includes monitoring for a distraction level by the host vehicle, the distraction level being determined by at least one of the first road user's head orientation and the second road user's head orientation.

(19) A non-transitory computer-readable medium including computer-readable instructions that, when executed by a computing system, cause the computing system to sort data by performing a method comprising: monitoring, from a host vehicle, behavior of a first road user and a second road user; determining, by the host vehicle and from the monitored behavior of the first road user and the second road user, whether a threat to the first road user or the second road user is present, the threat being determined based on movement of the first road user or the second road user relative to other objects disposed about the road; and, signaling from the host vehicle to at least one of the first road user or the second road user of the threat in a case that the threat is determined to be present.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A method for broadcasting safety related information from a host vehicle traveling on a road, the method comprising:
    monitoring, from the host vehicle, behavior of a first road user and a second road user, the first road user and the second road user being different from the host vehicle;
    determining, based on the monitored behavior of the first road user and the second road user, whether a threat to the first road user or the second road user is present and whether the first road user or the second road user is mitigating the threat, the threat being determined based on movement of the first road user or the second road user relative to other objects disposed about the road;
    determining which of the host vehicle and another road user is to alert at least one of the first road user or the second road user of the threat in a case that the first road user or the second road user is not mitigating the threat;
    signaling, by physical operation of the host vehicle, to alert the at least one of the first road user or the second road user of the threat in a case that the host vehicle is to alert the at least one of the first road user or the second road user of the threat; and
    signaling to the other road user to alert the at least one of the first road user or the second road user of the threat in a case that the other road user is to alert the at least one of the first road user or the second road user of the threat, by a physical operation of a vehicle of the other road user.

2. The method of claim 1, wherein the host vehicle includes a machine learning-based system to determine whether the threat is present, the machine learning-based system comprising a trained neural network.

3. The method of claim 1, wherein the host vehicle is a semi-autonomous vehicle or an autonomous vehicle.

4. The method of claim 1, wherein the signaling, by physical operation of the host vehicle, is transmitted auditorily, visually, using wireless communication, or via a combination thereof.

5. The method of claim 1, wherein the signaling, by physical operation of the host vehicle, is at least an intervention by the host vehicle, the intervention being a change in position, speed, or a combination thereof by the host vehicle.

6. The method of claim 1, further comprising:
    obtaining, from collected sensor data by the host vehicle, a magnitude of the threat in the case that the threat is determined to be present, wherein the magnitude of the threat depends on speed of the first road user or the second road user relative to other objects disposed about the road, size of the first road user or second road user relative to other objects disposed about the road, or a combination thereof.

7. The method of claim 1, wherein monitoring behavior of the first road user and the second road user includes monitoring for a distraction level by the host vehicle, the distraction level being determined by at least one of the first road user's head orientation or the second road user's head orientation.

8. The method of claim 1, wherein determining which of the host vehicle and the other vehicle of the other road user is to alert the at least one of the first road user or the second road user is a determination made based upon visibility.

9. The method of claim 6, wherein the signaling, by the physical operation of the host vehicle, is at least an execution of a course of action that mitigates the magnitude of the threat.

10. The method of claim 6, wherein a degree of the signaling, by the physical operation of the host vehicle, increases as the magnitude of the threat increases.

11. A system for broadcasting safety related information from a host vehicle traveling on a road, the system comprising:
    processing circuitry configured to:
    monitor, from the host vehicle, behavior of a first road user and a second road user;
    determine, based on the monitored behavior of the first road user and the second road user, whether a threat to the first road user or the second road user is present and whether the first road user or the second road user is mitigating the threat, the threat being determined based on movement of the first road user or the second road user relative to other objects disposed about the road;
    determining which of the host vehicle and another road user is to alert at least one of the first road user or the second road user of the threat in a case that the first road user or the second road user is not mitigating the threat;
    cause the host vehicle to signal, by physical operation of thereof, to alert the at least one of the first road user or the second road user of the threat in a case that the host vehicle is to alert the at least one of the first road user or the second road user of the threat; and
    signal to the other road user to alert the at least one of the first road user or the second road user of the threat in a case that the other road user is to alert the at least one of the first road user or the second road user of the threat, by a physical operation of a vehicle of the other road user.

12. The system of claim 11, wherein the host vehicle includes a machine learning-based system to determine whether the threat is present, the machine learning-based system comprising a trained neural network.

13. The system of claim 11, wherein the host vehicle is a semi-autonomous vehicle or an autonomous vehicle.

14. The system of claim 11, wherein the signal, by the physical operation of the host vehicle, is transmitted auditorily, visually, using wireless communication, or via a combination thereof.

15. The system of claim 11, wherein the signal, by the physical operation of the host vehicle, is at least an intervention by the host vehicle, the intervention being a change in position, speed, or a combination thereof by the host vehicle.

16. The system of claim 11, wherein the processing circuitry is further configured to:
  obtain, from collected sensor data by the host vehicle, a magnitude of the threat in the case that the threat is determined to be present, wherein the magnitude of the threat depends on speed of the first road user or the second road user relative to other objects disposed about the road, size of the first road user or second road user relative to other objects disposed about the road, or a combination thereof.

17. The system of claim 11, wherein monitored behavior of the first road user and the second road user includes monitoring for a distraction level by the host vehicle, the distraction level being determined by at least one of the first road user's head orientation or the second road user's head orientation.

18. The system of claim 16, wherein the signal, by the physical operation of the host vehicle, is at least an execution of a course of action that mitigates the magnitude of the threat.

19. The system of claim 16, wherein a degree of the signal, by the physical operation of the host vehicle, increases as the magnitude of the threat increases.

20. A non-transitory computer-readable medium including computer-readable instructions that, when executed by a computing system, cause the computing system to sort data by performing a method comprising:
  monitoring, from a host vehicle, behavior of a first road user and a second road user;
  determining, based on the monitored behavior of the first road user and the second road user, whether a threat to the first road user or the second road user is present and whether the first road user or the second road user is mitigating the threat, the threat being determined based on movement of the first road user or the second road user relative to other objects disposed about the road;
  determining which of the host vehicle and another road user is to alert at least one of the first road user or the second road user of the threat in a case that the first road user or the second road user is not mitigating the threat;
  signaling, by physical operation of the host vehicle, to alert the at least one of the first road user or the second road user of the threat in a case that the host vehicle is to alert the at least one of the first road user or the second road user of the threat; and
  signaling to the other road user to alert the at least one of the first road user or the second road user of the threat in a case that the other road user is to alert the at least one of the first road user or the second road user of the threat, by a physical operation of a vehicle of the other road user.

* * * * *